US008688895B2

(12) United States Patent
Ahn et al.

(10) Patent No.: US 8,688,895 B2
(45) Date of Patent: Apr. 1, 2014

(54) MEMORY SYSTEM AND DATA MANAGEMENT METHOD OF FLASH TRANSLATION LAYER THEREOF

(75) Inventors: Chunsoo Ahn, Suwon-si (KR); HeeTak Shin, Hwaseong-si (KR); JaeSung Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 668 days.

(21) Appl. No.: 12/654,393

(22) Filed: Dec. 18, 2009

(65) Prior Publication Data
US 2010/0223420 A1 Sep. 2, 2010

(30) Foreign Application Priority Data

Feb. 27, 2009 (KR) .................. 10-2009-0016867

(51) Int. Cl.
*G06F 13/00* (2006.01)
(52) U.S. Cl.
USPC .................................. 711/103; 711/E12.006
(58) Field of Classification Search
None
See application file for complete search history.

(56) References Cited

U.S. PATENT DOCUMENTS

| 6,185,663 | B1* | 2/2001 | Burke | 711/156 |
| 6,189,081 | B1 | 2/2001 | Fujio | |
| 6,219,752 | B1* | 4/2001 | Sekido | 711/114 |
| 6,938,116 | B2* | 8/2005 | Kim et al. | 711/103 |
| 8,386,696 | B2* | 2/2013 | Kim et al. | 711/103 |
| 2006/0004971 | A1* | 1/2006 | Kim et al. | 711/154 |
| 2007/0194105 | A1* | 8/2007 | Kissick | 235/379 |
| 2008/0104309 | A1* | 5/2008 | Cheon et al. | 711/103 |
| 2008/0183949 | A1* | 7/2008 | Ly et al. | 711/103 |
| 2008/0189490 | A1* | 8/2008 | Cheon et al. | 711/144 |
| 2008/0195804 | A1* | 8/2008 | Kim et al. | 711/103 |
| 2008/0201518 | A1* | 8/2008 | Kim et al. | 711/103 |
| 2009/0276609 | A1* | 11/2009 | Moyer et al. | 712/220 |
| 2010/0169544 | A1* | 7/2010 | Eom et al. | 711/103 |
| 2013/0159605 | A1* | 6/2013 | Lau et al. | 711/103 |

FOREIGN PATENT DOCUMENTS

| JP | 09-319645 | 12/1997 |
| JP | 2006-228138 | 8/2006 |
| JP | 2007-279873 | 10/2007 |
| KR | 10-0320897 | 1/2002 |

* cited by examiner

*Primary Examiner* — Sean D Rossiter
(74) *Attorney, Agent, or Firm* — Harness, Dickey & Pierce, P.L.C.

(57) ABSTRACT

A data management method includes determining the size of input data, storing the input data in a log block if the size of the input data is determined to be a write unit, and storing the input data in a partial block if the size of the input data is determined to be smaller than the write unit. The log block is a temporary block storing data of same addresses and the partial block is a temporary block storing data regardless of their addresses. The memory system includes a nonvolatile memory and a memory controller configured to control the nonvolatile memory. The memory controller is configured to temporarily store input data smaller than a write unit in a selected memory block even when the input data have different addresses.

19 Claims, 9 Drawing Sheets

MEMORY SYSTEM AND DATA MANAGEMENT METHOD OF FLASH TRANSLATION LAYER THEREOF

CROSS-REFERENCE TO RELATED APPLICATIONS

This U.S. non-provisional patent application claims priority under 35 U.S.C. §119 of Korean Patent Application No. 10-2009-0016867, filed on Feb. 27, 2009, the entire contents of which are hereby incorporated by reference.

BACKGROUND

Example embodiments are directed to a memory system and a data management method of a flash translation layer thereof.

In general, memory systems include a memory device for storing data and a host for controlling an operation of the memory device. Memory devices are classified into volatile memories and nonvolatile memories. Examples of the volatile memories include DRAMs and SRAMs, and examples of the nonvolatile memories include EEPROMs, FRAMs, PRAMs, MRAM, and flash memories.

The volatile memories lose data stored therein when power supply thereto is interrupted, whereas the nonvolatile memories retain data stored therein even when power supply thereto is interrupted. Among the nonvolatile memories, flash memories are widely used as data storage media because of their high program speed, low power consumption and high data storage capacity.

Memory devices requiring high integration may not always be reliable due to the restrictions in a fabrication process. While the malfunction and yield degradation due to high integration of memory devices may be overcome, it is not easy for a user to determine memory device malfunctions when a memory device is installed and being used in a memory system.

In general, high-capacity storage devices such as flash memory cards and solid state disks (SSDs) are configured to include a plurality of flash memory chips. Reserved replacement blocks serve to replace the memory blocks that malfunction due to program/erase failures. However, no such replacement service is available for any further malfunctioning memory blocks once all the replacement blocks have been occupied.

Semiconductor memory devices store data, which can then be read therefrom. The semiconductor memory devices are classified into random-access memories (RAMs) and read-only memories (ROMs). RAMs are classified as volatile memories since they lose data stored therein when power supply is interrupted. ROMs are classified as nonvolatile memories since they retain data even after power interruption.

A flash memory device is a nonvolatile memory device used in portable electronic devices such as digital cameras, MP3 players, mobile phones and PDAs because the flash memory consumes low power and has high circuit integration. When flash memories are used in portable electronic devices, the reliability and lifetime of the portable electronic devices depend on the reliability and lifetime of the flash memories. Thus, it is important to improve the reliability and lifetime of the flash memories.

Semiconductor memory devices store data, which can then be read therefrom. The semiconductor memory devices are classified into volatile memory devices and nonvolatile memory devices. When power supply is interrupted, the volatile memory devices lose data stored therein, examples of which include SRAMs, DRAMs, and SDRAMs. However, even when power supply is interrupted, the nonvolatile memory devices retain data stored therein, examples of which include ROMs, PROMs, EPROMs, EEPROMs, and flash memories, PRAMs, MRAMs, and FRAMs. The flash memories are classified into NAND flash memories and NOR flash memories.

Computing systems use a semiconductor disk device, instead of a hard disk device, as a storage medium. In terms of reliability and speed, the semiconductor disk devices are superior to hard disk devices using rotating disks.

SUMMARY

According to an example embodiment, a data management method of a flash translation layer may include determining a size of input data; and storing the input data in a log block when the size of the input data is determined to be a write unit and storing the input data in a partial block when the size of the input data is determined to be smaller than the write unit. The log block and the partial block may be temporary blocks of memory located on a single memory device or located on separate memory devices and the log block may store data having same addresses and the partial block may store data regardless addresses of the data.

According to an example embodiment, the data management method may further include performing a merge operation between the log block and a data block if there is no log block to store full page data.

According to an example embodiment, the data management method may further include performing a merge operation between the partial block and a data block if a desired amount of data is stored in the partial block.

According to an example embodiment, the merge operation of the partial block and the merge operation of the log block may be performed at separate times.

According to an example embodiment, the merge operation of the partial block and the data block is an incremental merge operation, and the incremental merge operation is performed at least once whenever data is stored in a new partial block.

According to an example embodiment, a number of times the incremental merge operation is performed is determined based on a time for a write time-out.

According to an example embodiment, the data management method may further include managing the input data according to a first mapping table if the size of the input data is smaller than the write unit, and managing the input data according to a second mapping table if the size of the input data is the write unit.

According to an example embodiment, the first mapping table and the second mapping table may be stored in separate nonvolatile memories.

According to an example embodiment, information indicating the size of the data may be located at the beginning of the input data.

According to an example embodiment, information indicating the size of the data may be located at the end of the input data.

According to an example embodiment, the write unit may be a page.

According to an example embodiment, a memory system may include at least one nonvolatile memory; and a memory controller configured to control the nonvolatile memory. The memory controller may be configured to temporarily store input data smaller than a write unit in a selected memory block of the nonvolatile memory, even if the input data have different addresses.

According to an example embodiment, the memory controller is configured to perform an incremental merge operation based on the data stored in the selected memory block of the nonvolatile memory if the selected memory block stores a desired amount of data, and the memory controller is configured to avoid a write time-out in performing the incremental merge operation.

According to an example embodiment, non-volatile memory includes a plurality of NAND flash memories, and the memory controller may be configured to control at least one of the plurality of NAND flash memories.

According to an example embodiment, one NAND flash memory may store partial page data and a mapping table for managing the partial page data and another NAND flash memory may store full page data and a mapping table for managing the full page data.

According to an example embodiment, the memory system may be a smart card.

According to an example embodiment, the memory system may be a solid state disk (SSD).

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Figure 1:
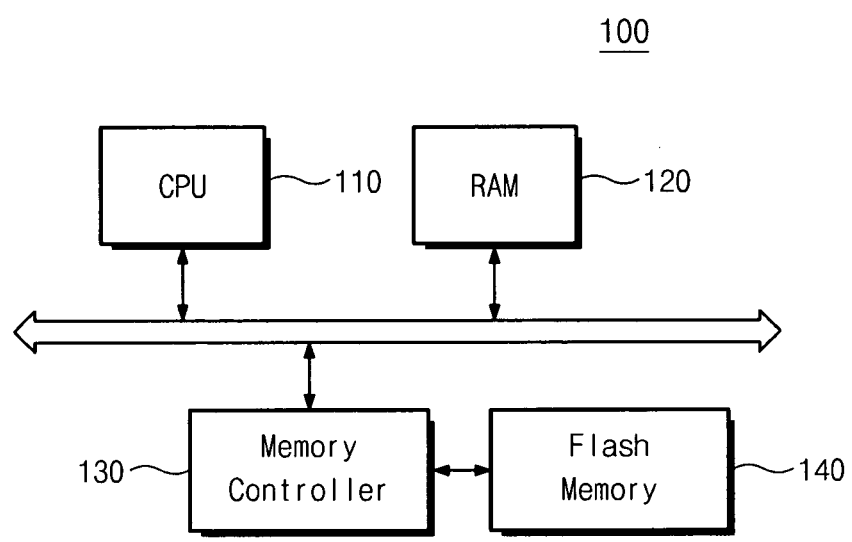
FIG. 1 is a hardware block diagram of a memory system according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a hardware block diagram of a memory system 100 according to an example embodiment.

Referring to FIG. 1, the memory system 100 may include a central processing unit (CPU) 110, a random access memory (RAM) 120, a memory controller 130, and a flash memory 140. The memory controller 130 is configured to operate on input data during a write operation using methods based on a size of the input data. For example, when the size of input data is a write unit (e.g., a page), the input data is operated upon according to a first mapping table; and when the size of input data is smaller than the write unit, the input data is operated upon according to a second mapping table. This data operation/management method will be described later in detail with reference to FIGS. 3 and 4.

FIG. 1 illustrates the memory system 100 including a flash memory 140. However, the memory system is not limited thereto and other types of memories may also be used in the memory system 100. The memory system according to some example embodiments may also be used with various non-volatile memories (e.g., NAND flash memories, NOR flash memories, MRAMs, and FRAMs). The memory system according to some example embodiments may also be used with any system that manages input data by different methods according to the sizes of the input data.

The CPU 110 controls an overall operation of the memory system 100.

The RAM 120 is used to store temporary data necessary for an operation of the memory system 100. Examples of the RAM 120 include DRAMs and SRAMs. The memory system 100 may be configured to store data in RAM 120 and in the flash memory 140. While FIG. 1 illustrates that the memory system 100 uses the RAM 120 to store temporary data, example embodiments of the memory system 100 are not limited thereto and a variety of other types of memories may be used with the memory system 100. However, in some example embodiments, the RAM 120 of the memory system may be replaced by a PRAM to store temporary data.

The memory controller 130 controls the flash memory 140 according to the read/write request from a host (not illustrated). Also, the memory controller 130 may be provided with an ECC engine for error correction of the data stored in the flash memory 140.

According to a write request, the memory controller 130 compares the size of input data with a desired value (e.g., a write unit) and, based on the comparison result, determines whether to store the input data in a log block or a partial block. Herein, the log block is a memory block that is used to temporarily store input data having the desired size. Data of the same address are stored in the log block. The partial block is a memory block that is used to sequentially and temporarily store input data with a size smaller than the desired value regardless of logical addresses. Hereinafter, for the convenience of description, data with a size of a desired value will be referred to as full page data, and data with a size smaller than the desired value will be referred to as partial page data.

The memory controller 130 manages input data according to a first mapping table for managing data stored in a log block and a second mapping table for managing data stored in a partial block. Herein, the first mapping table and the second mapping table are stored in a meta region (not illustrated) of the flash memory 140. The first mapping table and the second mapping table are loaded into the RAM 120 during an initialization operation of the memory system 100.

The flash memory 140 includes a meta region (not illustrated) for storing management information (e.g., the first and second mapping tables) necessary for managing an operation of the flash memory 140, and a data region for storing user data. Although FIG. 1 illustrates that the memory system 100 includes one flash memory, the memory system 100 according to example embodiments may include one or more flash memories.

In general, small-sized file system data and user data are transmitted in a random order at a write request. However, conventional memory systems may store both system data (partial page data) and user data in a log block. Because a log block is configured to store only data of the same address, a limited number of log blocks are consumed rapidly by a plurality of system data of different addresses. Accordingly, a merge operation for the log blocks is carried out numerous times, thus degrading the write operation performance.

On the other hand, the memory system 100 stores file system data, i.e., partial page data in a partial block, stores large-sized full page data in a log block, and manages the partial block and the log block separately. In particular, the partial page data are stored in the same partial block regardless of having different addresses. In this case, because the partial page data are sequentially stored in the partial block regardless of logical addresses, a write operation of user data can be completed without a merge operation, thus improving the overall write operation performance of the memory system 100.

Figure 2:
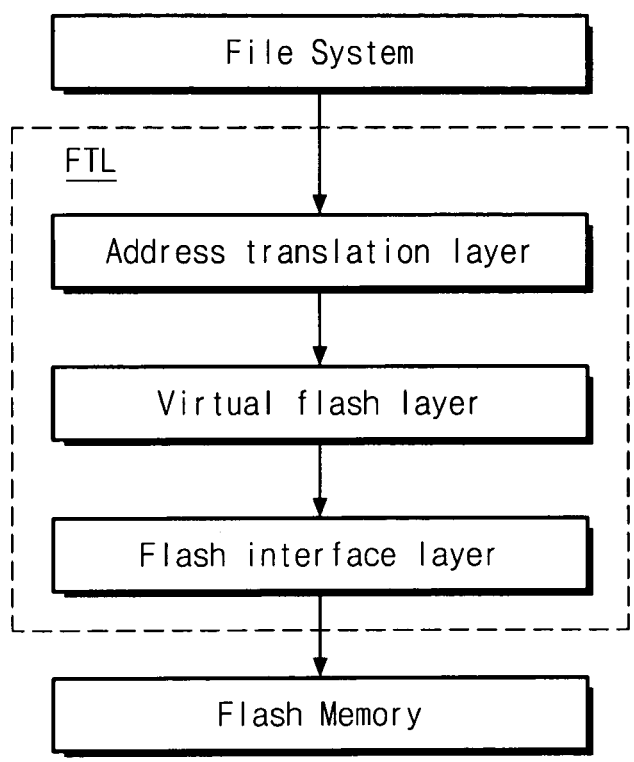
FIG. 2 is a software block diagram of the memory system according to an example embodiment.

FIG. 2 is a software block diagram of the memory system according to an example embodiment.

Referring to FIG. 2, a flash translation layer (FTL) performs an address translation process for a read/write operation of a flash memory based on logical addresses and numbers received from a file system. The addresses received from the file system are requested from a host (not illustrated). The FTL according to the example embodiment of FIG. 2 is configured to vary a data management policy according to a size of input data, thereby guaranteeing minimum performance.

The FTL includes an address translation layer, a virtual flash layer, and a flash interface layer.

The address translation layer translates a logical address, received from the file system, into a logical page address. The address translation layer performs an address translation process based on mapping information that is generated by mapping a logical address received from the host to a logical page address of the flash memory. The mapping information is stored in a meta region of the flash memory. Example embodiments use a hybrid mapping method as the address mapping method.

The hybrid mapping method is a compromise between a page mapping method and a block mapping method. The page mapping method performs an address mapping operation on a page basis, and the block mapping method performs an address mapping operation on a memory block basis. The hybrid mapping method is used to reduce a mapping table size and a merge operation.

The FTL according to example embodiments manages full page data according to a first mapping table and manages partial page data according to a second mapping table.

When the size of data input from the file system is a desired value (e.g., a page), the input data are stored in a log block according to the first mapping table. Herein, full page data is stored in the log block based on addresses received from the file system. For example, full page data of the same address are stored in the same physical log block, and full page data of different addresses are stored in different physical log blocks. Meanwhile, if there is no log block to store full page data, a merge operation is performed between a data block and a log block.

On the other hand, when the size of data input from the file system is smaller than the desired value, the input data is stored in a partial block according to the second mapping table. Herein, partial page data is sequentially stored in the same partial block sequentially regardless of logical addresses received from the file system. Meanwhile, if a desired amount of data becomes stored in a partial block, an incremental merge operation is performed between a data block and the partial block.

Also, the FTL according to example embodiments is configured to manage data in a same memory block that have a plurality of logical address.

The FTL manages data according to different management policies based on the sizes of input data. In particular, partial page data are stored in a partial block sequentially regardless of addresses received from the file system. Accordingly, the number of times a merge operation may occur due to input of small-sized partial page data can be reduced in a write operation, thus improving the write operation performance of the memory system.

The virtual flash layer translates the logical page address, translated by the address translation layer, into a virtual page address. Herein, the virtual page address corresponds to a physical address of a virtual flash memory. Bad blocks in the virtual flash memory are reduced in number by performing a bad block processing operation of the flash memory. That is, the virtual page address corresponds to a physical block of the flash memory and does not include bad blocks.

The virtual flash layer controls an operation of a flash controller on behalf of the address translation layer performed by the memory controller 130 of FIG. 1 and the flash memory needing an erase operation in other interfacing operations.

The flash interface layer translates the virtual page address into a physical page address of the flash memory. The flash interface layer performs a low level operation during an interfacing operation with the flash memory. For example, the flash interface layer includes a low level driver for controlling the hardware of the flash memory and an error correction code (ECC)/error block management (BBM) module for correcting an error in data read from the flash memory.

The FTL is configured to classify data input from the file system according to size and manage the classified data separately. Accordingly, the number of times of merge operation occurs for write operations is reduced even when partial page data of different addresses are transmitted from the file system, that is, even when file system data are transmitted frequently.

FIG. 2 illustrates that the FTL includes the above virtual flash layer. However, example embodiments of the FTL are not limited thereto.

Figure 3:
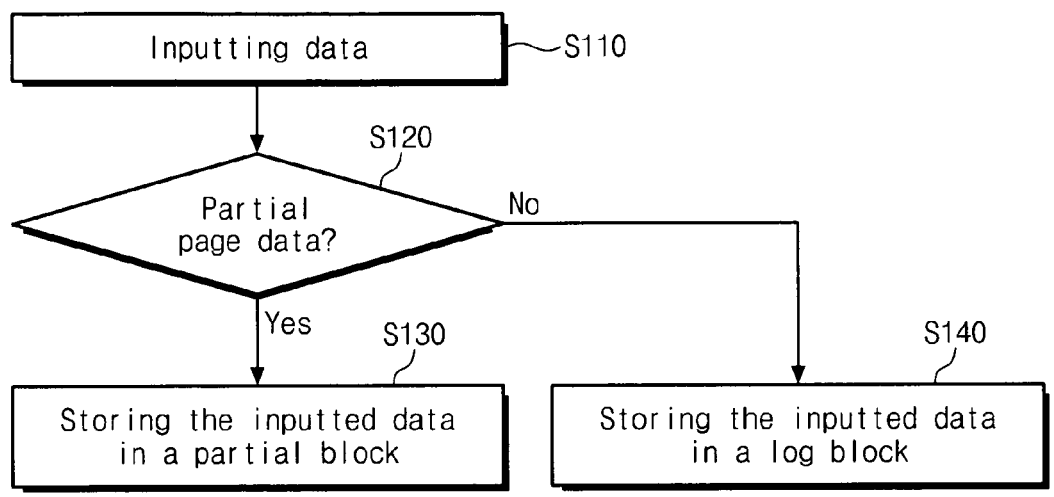
FIG. 3 is a flow chart illustrating a write operation of the memory system according to an example embodiment.

FIG. 3 is a flow chart illustrating a data storage method of the memory system according to an example embodiment. The data storage method will be described below with reference to FIGS. 1 and 3.

Referring to FIGS. 1 and 3, data are input according to the write request of the host (S110). The memory controller 130 determines whether the input data is partial page data (S120). Herein, whether the input data is partial page data is determined on basis of the size of input data transmitted from the host, or according to the presence/absence of a stop command transmitted from the host. The stop command is a command that is transmitted from the host periodically whenever the size of the transmitted data is greater than or equal to a predetermined value.

If the input data is partial page data, the input data are stored in a partial block according to the second mapping table (S130). On the other hand, if the input data is not partial page data, the input data is stored in a log block according to the first mapping table (S140).

According to an example embodiment, a memory block storing partial page data and a memory block storing full page data may be included in one flash memory. However, example embodiments are not limited thereto. The memory system according to example embodiments may include a plurality of flash memories, wherein the flash memory storing partial page data may be separate from the flash memory storing full page data.

Figure 4:
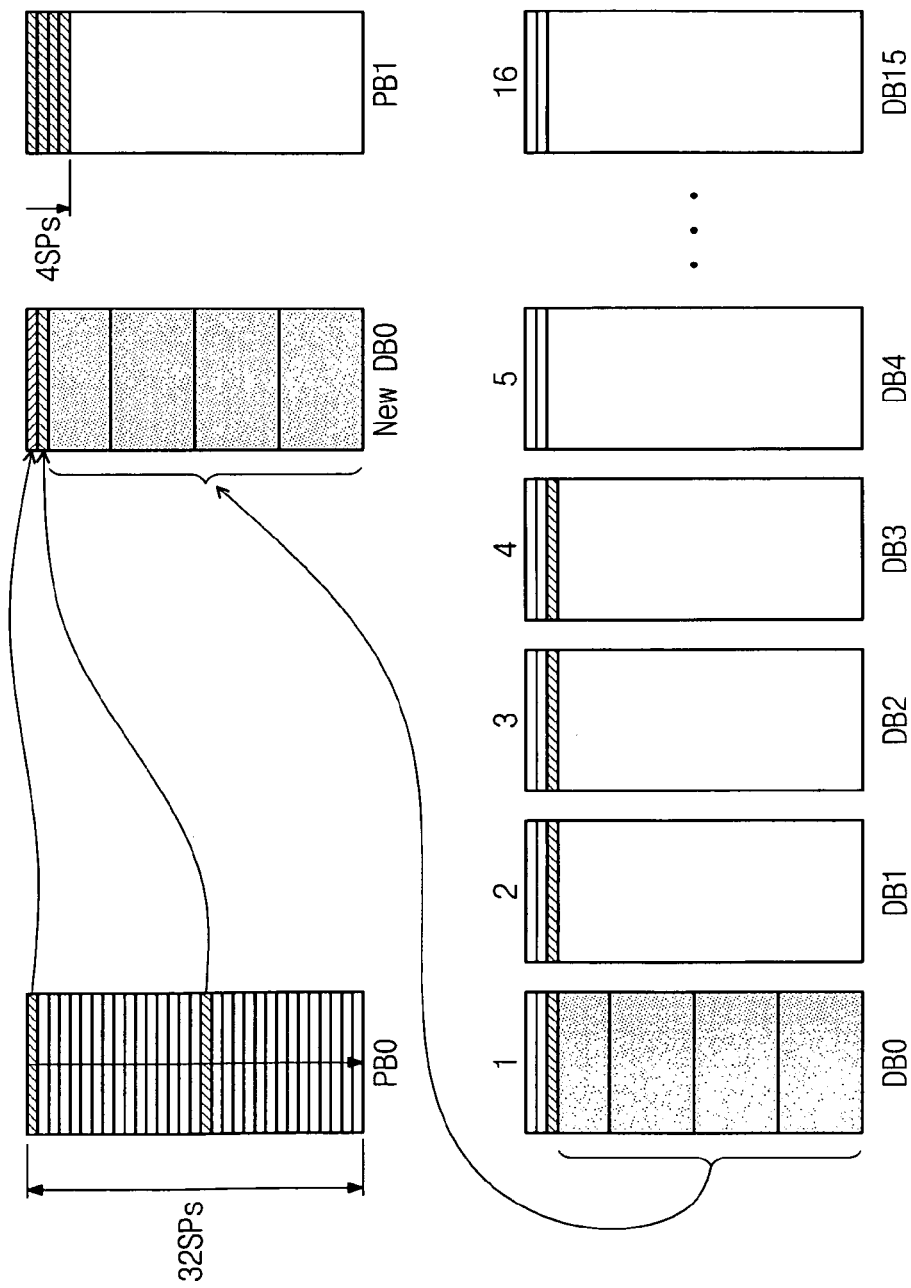
FIG. 4 is a diagram illustrating a merge operation of a memory system according to an example embodiment.

FIG. 4 is a diagram illustrating an incremental merge operation, which is performed when data of 16 logical addresses request a write operation, in order to describe a partial block merge algorithm according to an example embodiment.

Referring to FIG. 4, if partial page data corresponding to 16 logical addresses are input, the partial page data is stored in one physical memory block PB0. Herein, if the memory block PB0 is used up, an incremental merge operation is performed to merge partial blocks.

The memory system stores partial page data in a new memory block New DB0 (i.e., a partial block), which is separate from a memory block containing full page data, thus making it possible to perform an efficient merge operation.

As illustrated in FIG. 4, partial page data with 16 logical addresses are stored in one physical memory block PB0. If the memory block PB0 storing partial page data is to be used up, an incremental merge operation is performed.

Herein, the number of times of performing an incremental merge operation is determined by estimating a total merge time of one physical memory block and dividing the estimated total merge time by a minimum performance guarantee time. The total merge time is estimated in consideration of a program time of a flash memory, a read time, and the number of pages per block. Herein, the minimum performance guarantee time is a time to avoid the time-out of a write time.

For example, when the number of times of performing an incremental merge operation is 4, an incremental merge operation is performed whenever one page is stored in another memory block PB1 after one memory block PB0 is filled with partial page data. Accordingly, a merge operation for a block DB0 of a logical address '0' is completed when a total of four pages are stored.

A merge operation of a block DB1 of a logical address '1' is completed when the next four pages are stored in the memory block PB1. If a desired number of memory blocks can be secured, the minimum performance can be guaranteed while performing a partial page data merge operation in the memory blocks.

An incremental merge operation illustrated in FIG. 4 is performed whenever one page is stored in the memory block PB1 after one memory block PB0 is filled with partial page data. However, the incremental merge operation according to example embodiments is not limited thereto. The incremental merge operation may be performed when multiple pages are stored in the memory block PB1 after one memory block PB0 is filled with partial page data. Meanwhile, a write unit illustrated in FIG. 4 is a super page SP. Herein, the super page SP is a data size to perform a page-wise write operation.

In FIG. 4, 16 logical addresses are used in a write operation (i.e., the number of log blocks DB0 to DB15 is 16), according to an example embodiment. However, the number of logical address is not limited thereto.

A configuration of the memory system according to some example embodiments may vary according to a format of input data transmitted from the host. For example, the configuration of the memory system may depend on whether data size information is located at the beginning or at the end of the input data.

Figure 5:
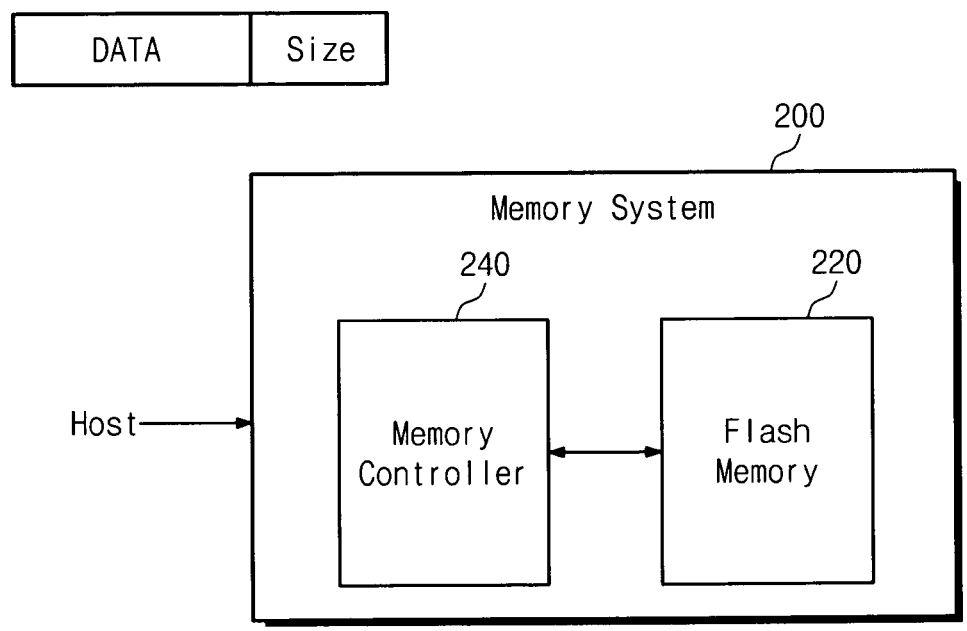
FIG. 5 is a diagram illustrating a memory system when data size information is located at the beginning of input data according to an example embodiment.

FIG. 5 is a diagram illustrating a memory system 200 when data size information is located at a front end of input data according to an example embodiment.

Referring to FIG. 5, the memory system 200 includes a flash memory 220 and a memory controller 240 controlling the flash memory 220. The memory controller 240 determines whether to store input data in a partial block or a log block, based on the data size information located in the beginning of the input data. The memory controller 240 manages data stored in a partial block, and data stored in a log block by different methods.

Figure 6:
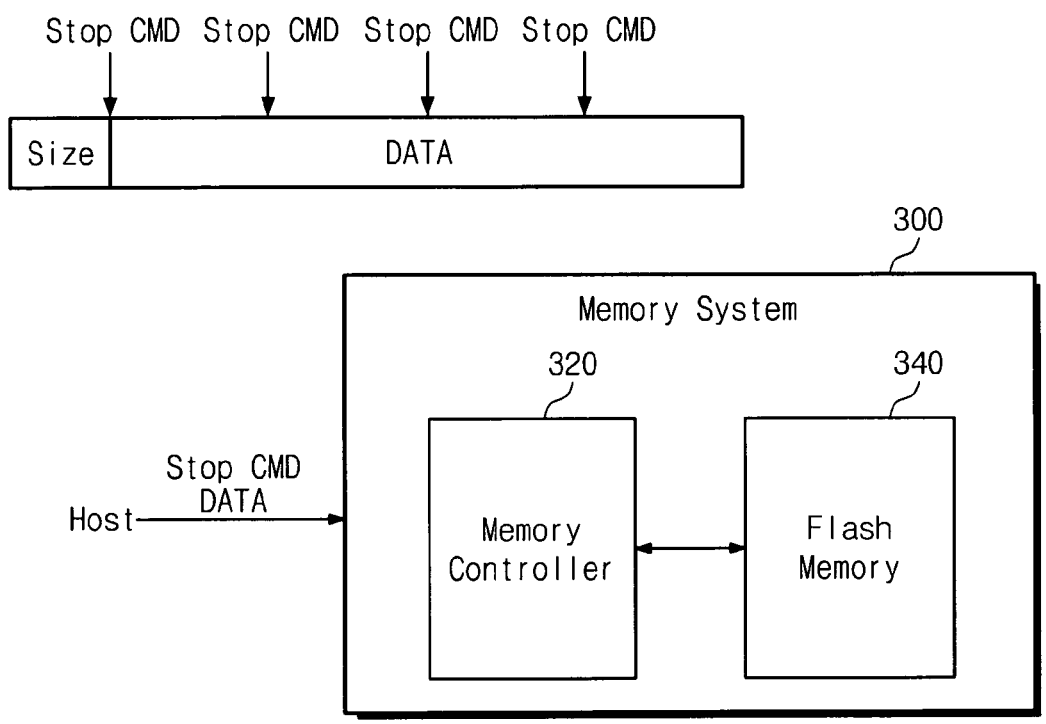
FIG. 6 is a diagram illustrating a memory system when data size information is located at the end of input data according to an example embodiment.

FIG. 6 is a diagram illustrating a memory system 300 when data size information is located in the end of input data according to an example embodiment.

Referring to FIG. 6, the memory system 300 includes a flash memory 320 and a memory controller 340 controlling the flash memory 320. The memory controller 340 determines whether to store input data in a partial block or a log block, according to a transmitted stop command. Herein, the stop command is transmitted from a host whenever the size of transmitted input data is greater than or equal to a desired value (e.g., a page).

Figure 7:
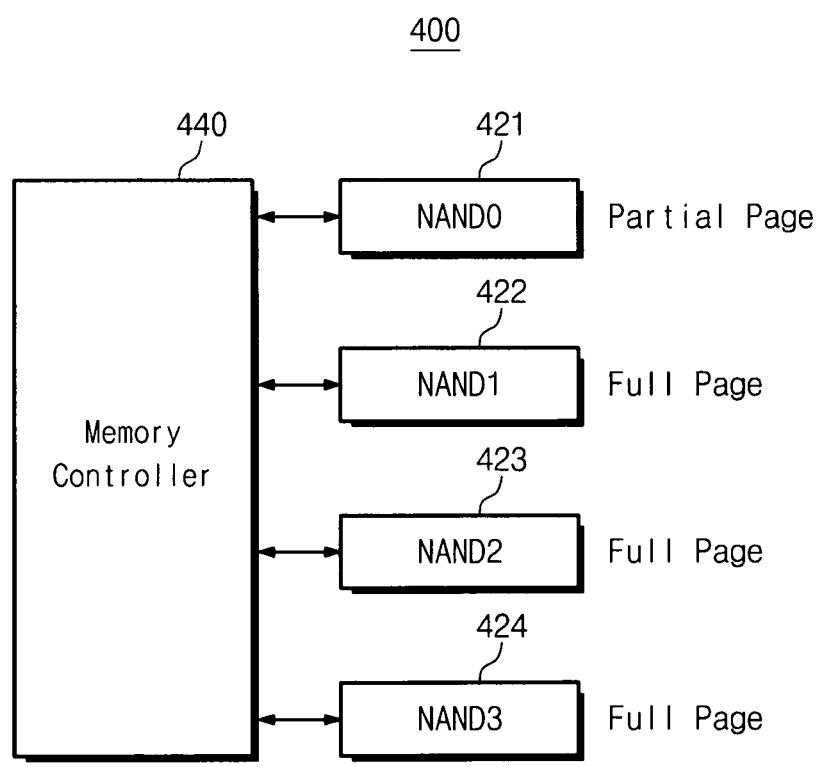
FIG. 7 is a block diagram of a memory system according to another example embodiment.

FIG. 7 is a block diagram of a memory system 400 according to according to an example embodiment.

Referring to FIG. 7, the memory system 400 includes a plurality of NAND flash memories 421~424 and a memory controller 440 controlling the NAND flash memories 421~424. The memory controller 440 performs a similar operation as the memory controller 130 of FIG. 1.

The first NAND flash memory 421 stores partial page data and a mapping table for managing the partial page data. At least one of the second to fourth NAND flash memories 422~424 stores full page data and a mapping table for managing the full page data.

Although FIG. 7 illustrates that the memory system 400 includes four NAND flash memories, example embodiments are not limited thereto. The memory system may include multiple NAND flash memories, wherein one of the NAND flash memories may store a mapping table for managing partial page data and at least one of the other NAND flash memories stores a mapping table for managing full page data.

It has been described above that the memory systems of FIGS. 1 to 7 are configured to manage data by two different methods according to the sizes of the data. However, example embodiments are not limited thereto. The memory system may be configured to manage data in a variety of different methods depending on the size of the data.

The memory system according to an example embodiment is also applicable to a memory card.

Figure 8:
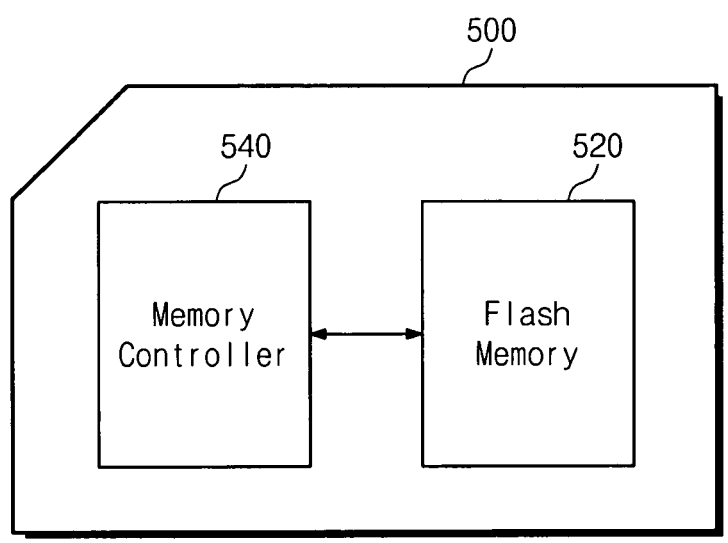
FIG. 8 is a block diagram of a memory card according to an example embodiment.

FIG. 8 is a block diagram of a memory card 500 according to an example embodiment.

Referring to FIG. 8, the memory card 500 includes a flash memory 520 storing data and a memory controller 540 controlling the flash memory 520. The memory controller 540 is configured to manage input data by using data management methods depending on the size of the input data.

The memory card 500 may be used in secure digital (SD) cards, multimedia cards (MMCs), extreme digital (xD) cards, compact flash (CF) cards, smart media (SM) cards, memory sticks or the like.

The memory system according to example embodiments may be applicable to a solid state disk (SSD).

Figure 9:
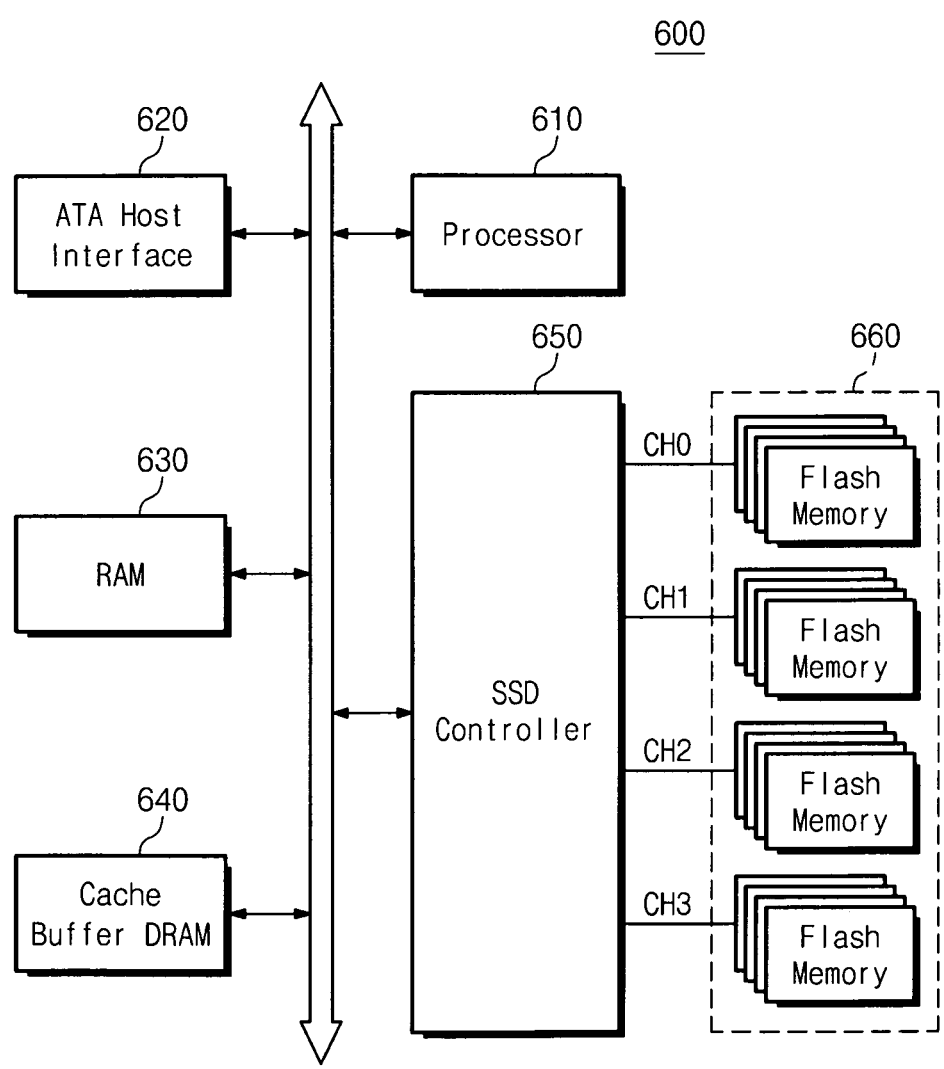
FIG. 9 is a block diagram of an SSD memory system according to an example embodiment.

FIG. 9 is a block diagram of an SSD memory system 600 according to an example embodiment.

Referring to FIG. 9, the SSD memory system 600 includes an SSD controller 650 and a plurality of flash memories 660. The function of the SSD controller 650 may be similar to the function as the memory controller 130 of FIG. 1, and the SSD controller 650 may manage data during a write operation by using above disclosed data management methods based on the size of the data.

A processor 610 receives a command from a host and determines/controls whether to store data received from the host in the flash memory or whether to transmit data read from the flash memory to the host.

The ATA host interface 620 exchanges data with the host under the control of the processor 610. The ATA host interface 620 receives commands and addresses from the host and transfers the same through a CPU bus to the processor 610. Herein, the ATA host interface 620 may be one of a serial ATA (SATA) interface, a parallel ATA (PATA) interface, an external SATA (ESATA) interface or the like.

Data, which is received from or transmitted to the host through the ATA host interface 620, is transferred through a cache buffer RAM 640 under the control of the processor 610 without passing through the CPU bus.

A RAM 630 is use to store temporary data necessary for an operation of the SSD memory system 600. The RAM 630 is a volatile memory device, examples of which include DRAMs and SRAMs.

The cache buffer RAM 640 is used to temporarily store data transferred between the host and the flash memories 660. The cache buffer RAM 640 is also used to store a program executed by the processor 610. The cache buffer RAM 640 may be a buffer memory, and may be configured using an SRAM.

The SSD controller 650 exchanges data with the flash memories used as storage devices. The SSD controller 650 may be configured to support a NAND flash memory, a one-NAND flash memory, a multi-level flash memory, and a single-level flash memory.

The memory system according example embodiments may be used as a mobile storage device. Thus, the memory system may be used as a storage device for an MP3 player, a digital camera, a PDA, an e-book or the like. The memory system may also be used as a storage device for a digital TV and a computer.

The storage device or the memory system may be mounted on various types of packages. Examples of the packages of the storage device or the memory system include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-level Processed Stack Package (WSP).

As described above, the memory system manages input data in a write operation by different methods depending on the size of the input data. Small-sized input data is stored in the same memory block regardless of addresses. Accordingly, the memory system according to example embodiments may reduce the number of merge operations, thus improving the overall write performance of the memory system.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A data management method of a flash translation layer, the method comprising, for each input data:
   determining a size of the input data;
   storing the input data in a log block, if the size of the input data is determined to be a page; and
   storing the input data in a partial block, if the size of the input data is determined to be smaller than a page, wherein
   the log block is a memory block that is used to store the input data having a same logical block address as all other input data stored in the log block and the partial block is a memory block that is used to store the input data regardless of whether the logical block address of the input data is a same logical block address as all other input data stored in the partial block.

2. The data management method of claim 1, further comprising:
performing a merge operation between the log block and a data block, if there is no log block available.

3. The data management method of claim 2, further comprising:
performing a merge operation between the partial block and a data block, if the partial block is used up.

4. The data management method of claim 3, wherein the merge operation of the partial block and the merge operation of the log block are performed at separate times.

5. The data management method of claim 3, wherein the merge operation of the partial block and the data block is an incremental merge operation, and the incremental merge operation is performed at least once whenever data is stored in a new partial block.

6. The data management method of claim 5, wherein a number of times the incremental merge operation is performed is determined based on a time for a write time-out.

7. The data management method of claim 1, further comprising:
managing the input data according to a first mapping table if the size of the input data is smaller than the page; and
managing the input data according to a second mapping table if the size of the input data is the page.

8. The data management method of claim 7, wherein the first mapping table and the second mapping table are stored in separate nonvolatile memories.

9. The data management method of claim 1, wherein information indicating the size of the input data is located at the beginning of the input data.

10. The data management method of claim 1, wherein information indicating the size of the input data is located at the end of the input data.

11. The data management method of the claim 1, wherein the log block and the partial block are memory blocks located on a single memory device.

12. The data management method of the claim 1, wherein the log block and the partial block are memory blocks located on separate memory devices.

13. The data management method of the claim 1, wherein the logical addresses are logical block addresses.

14. A memory system comprising:
at least one nonvolatile memory configured to store input data received from a host; and
a memory controller configured to control the nonvolatile memory by,
comparing the size of input data to a page;
second comparing an address of a piece of input data in a stream to an address of other pieces of input data in the stream;
storing the input data in a partial block of the at least one nonvolatile memory, if the size of the input data is smaller than the page; and
storing the input data in a log block of the at least one nonvolatile memory, if the size of the input data is the page, wherein
the partial block stores input data having at least two logical block addresses and the input data stored in the log block has a same logical block address as all other input data stored in the log block, and
the logical block addresses are received from the host.

15. The memory system of claim 14, wherein the memory controller is configured to,
perform an incremental merge operation based on the data stored in a selected memory block of the nonvolatile memory, if the selected memory block stores a desired amount of data, and
avoid a write time-out in performing the incremental merge operation.

16. The memory system of claim 14, wherein the nonvolatile memory includes a plurality of NAND flash memories, and the memory controller is configured to control at least one of the plurality of NAND flash memories.

17. The memory system of claim 16, wherein one of the plurality of NAND flash memories stores partial page data and a mapping table for managing the partial page data and another NAND flash memory of the plurality of NAND flash memories stores full page data and a mapping table for managing the full page data.

18. The memory system of claim 14, wherein the memory system is a smart card.

19. The memory system of claim 14, wherein the memory system is a solid state disk (SSD).

* * * * *